(12) United States Patent
Huang et al.

(10) Patent No.: US 7,903,652 B2
(45) Date of Patent: Mar. 8, 2011

(54) SYSTEM AND METHOD FOR PEER TO PEER VIDEO STREAMING

(75) Inventors: Yennun Huang, Bridgewater, NJ (US); Yih-Farn Chen, Bridgewater, NJ (US); Rittwik Jana, Parsippany, NJ (US); Amy Reibman, Chatham, NJ (US); Bin Wei, Basking Ridge, NJ (US); Zhen Xiao, White Plains, NY (US); Michael Rabinovich, Solon, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 812 days.

(21) Appl. No.: 11/610,994

(22) Filed: Dec. 14, 2006

(65) Prior Publication Data

US 2008/0144621 A1  Jun. 19, 2008

(51) Int. Cl.
*H04L 12/56* (2006.01)
*H04N 7/173* (2006.01)

(52) U.S. Cl. .......................... 370/390; 370/468; 725/105
(58) Field of Classification Search .................. None
See application file for complete search history.

(56) References Cited

U.S. PATENT DOCUMENTS

| | | | |
|---|---|---|---|
| 5,631,694 A * | 5/1997 | Aggarwal et al. ............... | 725/93 |
| 6,385,366 B1 * | 5/2002 | Lin ................. | 385/24 |
| 7,126,955 B2 | 10/2006 | Nabhan et al. | |
| 7,385,995 B2 * | 6/2008 | Stiscia et al. .................. | 370/412 |
| 7,573,875 B2 * | 8/2009 | Cankaya ....................... | 370/390 |
| 2002/0007492 A1 * | 1/2002 | Smyth et al. ................... | 725/107 |
| 2002/0191250 A1 | 12/2002 | Graves et al. | |
| 2003/0126277 A1 | 7/2003 | Son et al. | |
| 2003/0204602 A1 * | 10/2003 | Hudson et al. ................. | 709/228 |
| 2003/0229900 A1 * | 12/2003 | Reisman ......................... | 725/87 |
| 2004/0031058 A1 * | 2/2004 | Reisman ........................ | 725/112 |
| 2004/0141759 A1 | 7/2004 | Stiscia et al. | |
| 2005/0155075 A1 | 7/2005 | Crichton | |
| 2006/0007947 A1 * | 1/2006 | Li et al. ......................... | 370/432 |
| 2006/0089954 A1 | 4/2006 | Anschutz | |
| 2006/0098613 A1 | 5/2006 | Kish | |
| 2006/0173940 A1 | 8/2006 | Guntupalli et al. | |

(Continued)

FOREIGN PATENT DOCUMENTS

WO    WO-03026220 A1    3/2003

(Continued)

OTHER PUBLICATIONS

"International Application Serial No. PCT/US2007/025441, International Search Report mailed Jul. 1, 2008", 5 pgs.

(Continued)

*Primary Examiner* — Melanie Jagannathan
(74) *Attorney, Agent, or Firm* — Andrew Gust; Guntin Meles Gust PLC

(57) ABSTRACT

In an Internet Protocol Television (IPTV) system, an IPTV server is configured to receive a request from an IPTV content storage device (CSD) to view a video stream. The IPTV server selects a set of peers for the IPTV CSD, and transmits the set of peers to the IPTV CSD. In the system, a capacity of a fiber to the node (FTTN) switch in a down linking direction is greater than or equal to a sum of a number of simultaneous viewers supported by the FTTN switch plus a number of viewers that receive video streams from peers in the same community.

32 Claims, 7 Drawing Sheets

U.S. PATENT DOCUMENTS

| | | | |
|---|---|---|---|
| 2006/0239275 A1 | 10/2006 | Zlateff et al. | |
| 2006/0242155 A1 | 10/2006 | Moore | |
| 2007/0118857 A1* | 5/2007 | Chen et al. | 725/61 |
| 2007/0153820 A1* | 7/2007 | Gould | 370/432 |
| 2007/0186243 A1* | 8/2007 | Pettit et al. | 725/46 |
| 2007/0206507 A1* | 9/2007 | Reichman et al. | 370/252 |
| 2007/0220553 A1* | 9/2007 | Branam et al. | 725/46 |
| 2007/0220575 A1* | 9/2007 | Cooper et al. | 725/118 |
| 2007/0277205 A1* | 11/2007 | Grannan | 725/80 |
| 2007/0294422 A1* | 12/2007 | Zuckerman et al. | 709/230 |
| 2008/0049701 A1* | 2/2008 | Bellford et al. | 370/342 |
| 2008/0098212 A1* | 4/2008 | Helms et al. | 713/155 |
| 2008/0133767 A1* | 6/2008 | Birrer et al. | 709/231 |
| 2008/0141321 A1* | 6/2008 | Kubat et al. | 725/110 |

FOREIGN PATENT DOCUMENTS

| | | |
|---|---|---|
| WO | WO-2008076288 A2 | 6/2008 |
| WO | WO-2008076288 A3 | 6/2008 |

OTHER PUBLICATIONS

"International Application Serial No. PCT/US2007/025441, Written Opinion mailed Jul. 1, 2008", 5 pgs.

Annapureddy, S , et al., "Providing video-on-demand using peer-to-peer networks", *In Proceedings of the Internet Protocol Television Network in conjunction with the World Wide Web*, (2005), 1-14.

Hei, et al., "Insights into PPLive: A Measurement Study of a LargeScale P2P IPTV System", *In Proc. of IPTV Workshop, 2006*, (2006), 6 pgs.

* cited by examiner

| PARAMETERS | EXPLANATIONS |
|---|---|
| $B_{0D}$ | DOWNLOAD BANDWIDTH INTO A HOME. MUST BE GREATER THAN THE VIDEO STREAMING RATE TO GUARANTEE A GOOD IPTV SERVICE |
| $B_{0U}$ | UPLOAD BANDWIDTH OUT OF A HOME |
| $B_{1S}$ | TOTAL CAPACITY OF THE SOUTH-BOUND LINKS (DOWNLINKS) OF A LOCAL ACCESS SWITCH |
| $B_{1N}$ | CAPACITY OF THE NORTH-BOUND LINK (UPLINK) OF AN ACCESS SWITCH. DETERMINED BY THE TOTAL BANDWIDTH OF NORTH-BOUND FIBERS FROM A SWITCH TO A LOCAL VHO AND THE SWITCHING CAPACITY OF THE SERVICE ROUTER IN THE VHO |
| $B_{2S}$ | MAXIMUM THROUGHPUT IN A LOCAL VHO, IS DETERMINED BY CAPACITIES OF SERVICE ROUTERS, OPTICAL NETWORK CABLES AND/OR STREAMING SERVERS IN THE VHO |
| $B_{2N}$ | MAXIMUM CAPACITY OF THE NORTH-LINK OF SERVICE ROUTERS IN A LOCAL VHO |
| u | AVERAGE STREAMING BIT RATE FOR A VIDEO. MUST BE AT LEAST THE VIDEO ENCODING BIT RATE TO ENSURE A GOOD QUALITY SERVICE |
| k | MAXIMUM NUMBER OF CONCURRENT VIEWERS SUPPORTED BY A LOCAL ACCESS SWITCH |
| b | RATIO OF VIDEO UPLOAD TRAFFIC AND DOWNLOAD TRAFFIC IN A COMMUNITY |
| n | MAXIMUM NUMBER OF COMMUNITIES CONNECTED TO A LOCAL VHO |
| N | MAXIMUM NUMBER OF CONCURRENT VIEWERS SUPPORTED BY A VOCAL VHO |

*FIG. 2*

| P2P SHARING FOR PEERS WITHIN A COMMUNITY | C1: $B_{1S} \geq k(1+b)u$ <br> C2: $B_{1N} \geq k(1-b)u$ <br> C3: $B_{2S} \geq nB_{1N} \geq nk(1-b)u$ <br> C4: $N = nk \leq B_{2S}/[(1-b)u]$ |
|---|---|

*FIG. 3A*

| P2P SHARING AMONG PEERS IN ALL COMMUNITIES | C5: $B_{1S} \geq k(1+b)u$ <br> C6: $B_{1N} \geq k(1+b)u$ <br> C7: $B_{2S} \geq nB_{1N} \geq nk(1+b)u$ <br> C8: $N = nk \leq B_{2S}/[(1+b)u]$ |
|---|---|

*FIG. 3B*

SYSTEM AND METHOD FOR PEER TO PEER VIDEO STREAMING

TECHNICAL FIELD

Various embodiments relate to video broadcasts, and in an embodiment, but not by way of limitation, to a system and method for peer to peer video streaming in connection with video broadcasts.

BACKGROUND

Two types of Internet Protocol Television (IPTV) deployment include Fiber to the Node (FTTN) and Fiber to the Premise (FTTP). In FTTN, fiber optic cables are used to connect the central hub of a network service provider to a neighborhood node within approximately 3000 feet of customer homes. Copper wires are then used to connect the node to each individual home. FTTN provides approximately 20 to 25 Mbps network capacity. This is a significant improvement over current network infrastructures where copper wires are commonly used in the last 6000 feet or so and the available bandwidth is limited to 1.5-6.0 Mbps. In contrast, FTTP brings fiber directly to each individual customer home and can provide up to 39 Mbps bandwidth. However, the deployment and maintenance of FTTP can be expensive. It is estimated that FTTP requires approximately five times the capital investment of FTTN, and the deployment of FTTP can take four times as long as that of FTTN. Additionally, the capacity of the video servers in the network can quickly become a bottleneck.

In response to these cost and capacity problems, some IPTV systems have implemented a peer-to-peer (P2P) communication system. In such systems, end users (i.e., peers) interested in file sharing participate as both clients and servers, typically through an application overlay network. When a user locates an interesting file from another user, the downloading happens directly between the two without going through a central server. However, up to this point in time, IPTV P2P systems have viewed the underlying network as a cloud, and have not addressed the underlying infrastructure of a complex IPTV network. The art is therefore in need of a different approach in P2P streaming in IPTV networks.

BRIEF DESCRIPTION OF THE DRAWINGS

FIG. 2 illustrates a chart of parameters of an IPTV network.

FIG. 3A lists a chart of constraints for Peer to Peer sharing for peers within a community.

FIG. 3B lists a chart of constraints for Peer to Peer sharing among peers in all communities.

DETAILED DESCRIPTION

In an embodiment, an Internet Protocol Television (IPTV) server is configured to receive a request from an IPTV content storage device (CSD) to view a video stream. The IPTV server then selects a set of peers for the IPTV CSD, and transmits the set of peers to the IPTV CSD. In the system, a capacity of a fiber to the node (FTTN) switch in a down linking direction is greater than or equal to a sum of a maximum number of simultaneous viewers supported by the FTTN switch plus a number of viewers that receive video streams from peers in the same community, the sum being multiplied by an average streaming bit rate for the video stream.

In another embodiment, an Internet Protocol Television (IPTV) server is configured to receive a request from an IPTV content storage device (CSD) to view a video stream. The IPTV server transmits the video stream to the IPTV CSD when the IPTV server has enough capacity to serve the video stream. The IPTV server also calculates a maximum bandwidth that can be served by peers of the IPTV CSD, identifies peers that have the requested video stream and uplink capacity to serve the requested video stream, calculates a bandwidth of the video stream which can be provided by the IPTV server, and transmits a message to the IPTV CSD, the message including a bandwidth to be obtained from the peers, a peer set to use, and an encoding bandwidth of the video stream.

In another embodiment, an Internet Protocol Television (IPTV) content storage device (CSD) is configured to transmit a request to an IPTV server to view a video stream. The IPTV CSD is also configured to receive from the IPTV server a set of peers. In the system, a capacity of a fiber to the node (FTTN) switch in a down linking direction is greater than or equal to a sum of a maximum number of simultaneous viewers supported by the FTTN switch plus a number of viewers that receive video streams from peers in the same community, the sum being multiplied by an average streaming bit rate for the video stream.

In yet another embodiment, an Internet Protocol Television (IPTV) content storage device (CSD) is configured to transmit a request to an IPTV server to view a video stream, receive the video stream from the IPTV server when the IPTV server has enough capacity to serve the video stream, and receive a message from the IPTV server, the message including a bandwidth to be obtained from the peers, a peer set to use, and an encoding bandwidth of the video stream. In the system, the IPTV server calculates a maximum bandwidth that can be served by peers of the IPTV CSD, identifies peers that have the requested video stream and uplink capacity to serve the requested video stream, and calculates a bandwidth of the video stream which can be provided by the IPTV server.

Figure 1:
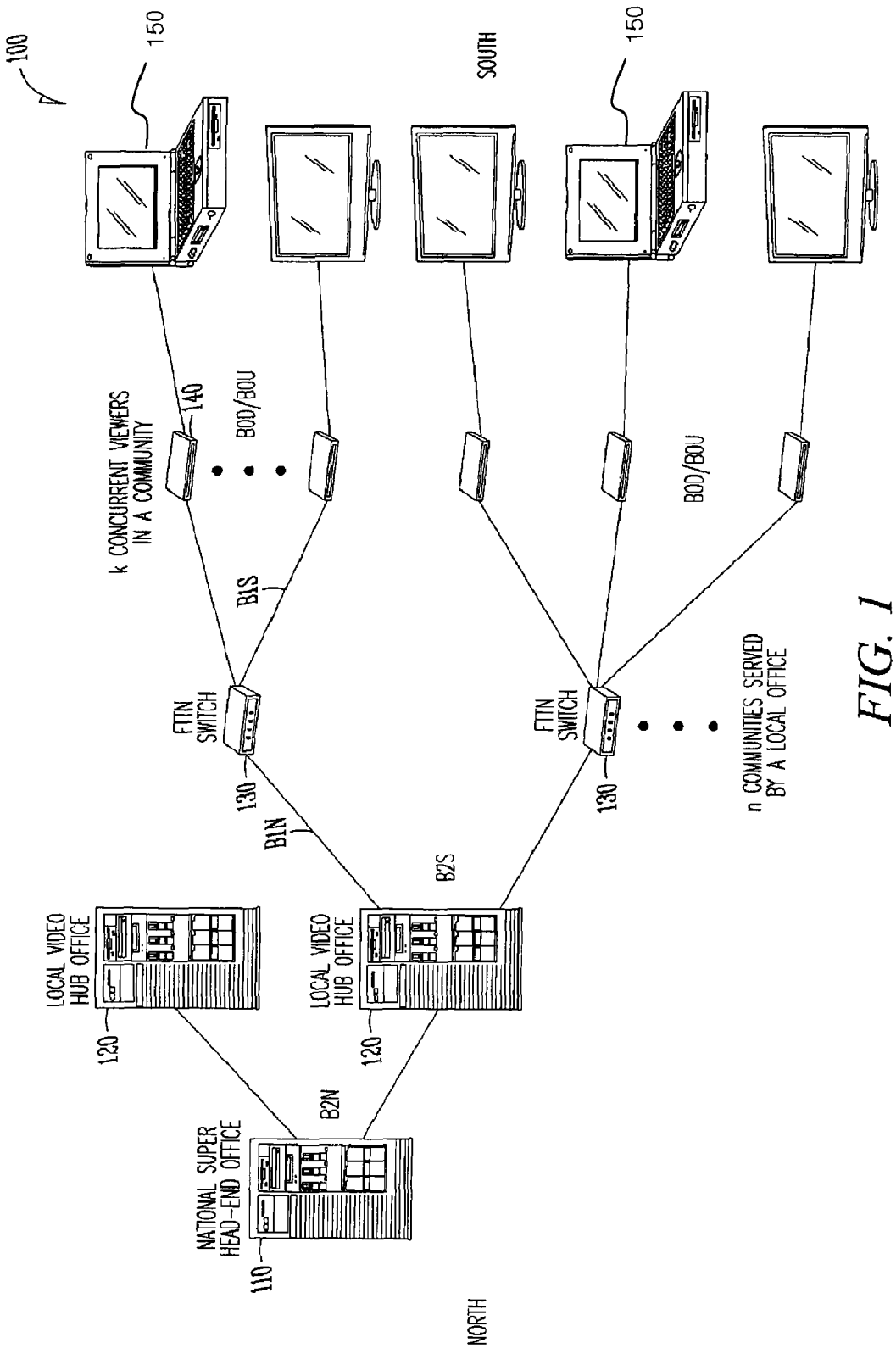
FIG. 1 illustrates an example embodiment of an Internet Protocol Television (IPTV) network.

FIG. 1 illustrates an example embodiment of an Internet Protocol Television (IPTV) network 100. The network 100 includes a number of national head-end office servers 110 (only one national head-end office is pictured in FIG. 1 for ease of illustration). The national head end office 110 is connected to a plurality of local video hub offices (VHO) 120. Each local head end office 110 is connected to a Fiber to the Node (FTTN) switch 130. Each FTTN switch 130 serves a community of users via their Set Top Boxes (STB) 140. The FTTN switches may also connect to personal computers/network storage devices 150. The national head-end office servers disseminate broadcast videos and on demand videos to the local video hub offices 120, which in turn distribute video content to the customers. The national head-end office is referred to as the north end of the network, and the STBs and/or viewers are referred to as the south end of the network.

Each local VHO office (often referred to as "local office" below) connects to a set of access switches such as xDSL, FTTN or CMTS switches through optical fiber cables. Each switch connects a community of IPTV service customers through twisted-pair copper wires, fibers or coaxial cables. A community consists of all homes which are connected to the same access (xDSL or CMTS) switch. Two or more homes are considered to be in close proximity when the connections between the homes are within about 5,000 feet of each other. A local VHO also includes a service router to connect to a national head-end office. These uplinks (or "north-bound links") of local offices are implemented over high-speed optical fiber networks. The parameters used throughout this disclosure are shown in FIG. 2.

Referring to FIGS. 1 and 2, $B_{OD}$, refers to the download bandwidth into a home (22 Mbps); $B_{OU}$, refers to the upload bandwidth out of a home (1 Mbps); $B_{1S}$, refers to the total capacity of south-bound links (downlinks) of an FTTN switch (24 Gbps); $B_{1N}$, refers to the capacity of the north-bound link (uplink) of an FTTN switch (1.24 Gbps); $B_{2S}$, refers to the maximum throughput in a local office, determined by capacities of service routers, optical network cables and/or streaming servers in a local office (up to 200 Gbps); $B_{2N}$, refers to the maximum capacity of the north-link of service routers in a local office (10 Gbps); u, refers to the average streaming bit rate for a video (should be at least the video encoding bit rate, 8-9 Mbps for high-definition programs and 2 Mbps for standard definition programs); k, refers to the maximum number of concurrent viewers supported by an FTTN switch; b, refers to the fraction of viewers in a community who get videos from peers, not from a local office; n, refers to the maximum number of communities connected to a local video hub office; N, refers to the maximum number of concurrent viewers supported by a local office; $S_c$, refers to the number of viewers who receive videos from peers within the same community; $S_a$, refers to the number of viewers who receive videos from peers in other communities.

A. Network Constraints for Conventional IPTV Services

To provide a good quality IPTV service, the following network conditions should be met. First, the download bandwidth to the home should be greater than the streaming rate, that is $B_{OD} \geq u$. Second, the downlink and uplink bandwidths of the FTTN switch should each be able to support k concurrent viewers in a community, that is $B_{1S} \geq uk$ and $B_{1N} \geq uk$. Third, the total number of communities served by a local office is bounded by the total downlink throughput in a local office, that is $B_{2S} \geq nB_{1N} \geq nku$ or $n \leq B_{2S}/(ku)$. Fourth, the maximum number of concurrent viewers supported by a local video office is nk.

The traffic on the uplinks of a local office (bounded by $B_{2N}$) depends on the video distribution policy used by an IPTV service provider. To reduce the load on the national offices, popular videos may be distributed to local offices during off-peak hours. In this case, an IPTV service administrator can apply a distribution policy where the most popular videos are available in local video hub offices so that the uplinks of local video offices will not become a bottleneck.

For example, a local hub office with a cluster of 100 video servers may be able to support up to 100 Gbps streaming throughput. Given the networking constraint, $B_{OD}=22$ Mbps, which is greater than the 6 Mbps encoding rate of a high-definition video, the maximum load on the south-link of an FTTN switch to support 192 concurrent viewers is 1.152 Gbps, which is much smaller than $B_{1S}=24$ Gbps. Similarly, the maximum load on the north-link of an FTTN switch is 1.152 Gbps. However, this almost saturates $B_{1N}$, the capacity of the link. The maximum number of communities served by a local video office, n is 87 (=100 G/1.152 G) and the maximum number of concurrent viewers supported by a local video office is 87×192=16704. Note that in this example, the bottleneck is $B_{1N}$, the link capacity between a local office and an FTTN switch.

In another example analysis involving P2P sharing among peers within a community, among k concurrent viewers in a community, $S_c=kb$ of them will get videos from peers within the same community, and $k-S_c$ will get videos from servers. The following constraints should be satisfied for good quality IPTV services:

C1: $B_{1S} \geq (k+S_c)u = k(1+b)u$

C2: $B_{1N} \geq (k-S_c)u = k(1-b)u$ $n \leq B_{2S}/[(k(1-b)u)]$ $N=nk \leq kB_{2S}/[(k(1-b)u)]$ P2P viewers get video from peers in its community, so the uploaded P2P video traffic is $uS_c$. Therefore, the total traffic generated by P2P sharing for the south-links (downlinks) of an FTTN switch is $2S_c$. In this case, the capacity of the southbound links (downlinks) of an FTTN switch must be greater than the sum of video streaming traffic $(k-S_c)u$ coming from video servers and the total P2P video traffic $2S_cu$ as shown in constraint C1 (FIG. 3A). Given the increased upload traffic, P2P sharing within a community may not be feasible if the downlink bandwidth of an FTTN switch is the bottleneck. However, P2P sharing decreases the load on the uplinks of the FTTN switch as shown in constraint C2. Therefore, P2P sharing for IPTV within a community will have the most benefit if the infrastructure bottleneck is on the uplink bandwidth of an FTTN switches.

In another example, $S_c=92$ out of 192 viewers get video from peers in their community. Then, the maximum load in the south-link of an FTTN switch is $(k+S_c)u=1.704$ Gbps, compared to 1.152 Gbps in the case above. The maximum load on the north-link of an FTTN switch is $(k-S_c)u=600$M bps, compared to 1.152 Gbps in the case above. The maximum number of communities supported by a local office, n=167 ($=B_{2S}/[(k(1-b)u)]=100$ G/600M), compared to 87 communities in the first case. The maximum number of concurrent viewers supported by a local video office is N=167×192=32064, compared to 16704 the first case.

This second case shows that P2P sharing reduces the load between a local office and an FTTN switch (the north-link of an FTTN switch) and therefore reduces the possibility that $B_{1N}$ is a bottleneck. This second case also shows that without upgrading existing network infrastructure, P2P sharing can significantly increase the number of concurrent viewers that can be served by a local video office.

In another case, involving P2P sharing among peers in a local hub office, P2P video sharing among all viewers served by a local office is considered. Within a community, $S_c$ viewers get all their videos from peers within the same community and $S_a$ viewers get the entire or part of their videos from peers in other communities, where $S_c+S_a=kb$. The following constraints must be satisfied to guarantee good quality IPTV service:

$B_{1S} \geq = (k+S_c+S_a)u \geq k(1+b)u$ $B_{1N} \geq (k-S_c+S_a)u \geq k(1-b)u$ $n \leq B_{2S}/[(k-S_c+S_a)u]$ $N=nk \leq kB_{2S}/[(k-S_c+S_a)u]$ The maximum traffic in the uplink of an FTTN switch occurs when each of the $S_a$ viewers get its entire video from peers outside its community. To maximize the capacity of a local office, the video sharing traffic among peers in all communities is balanced. When an equilibrium has been reached, each community will upload $S_a u$ bps to other communities and receive $S_a u$ bps from other communities for P2P video sharing. Thus, the total video streaming download traffic in the uplink (north link) of an FTTN switch is $(k-S_c-S_a)u$ bps coming from the local office servers and $S_a u$ bps coming from peers in other communities while the upload traffic is $S_a u$ bps to support peers in other communities. Therefore, in balance, the total traffic on the uplink of an FTTN switch is $(k-S_c-S_a)u+2S_a u$.

From the above constraints, increasing P2P sharing among peers across all communities (i.e., increasing $S_a$) increases the traffic on both the uplink and the downlinks of an FTTN switch, but reduces the load on the uplink of a local office. So, if $B_{2N}$ is the bottleneck, applying P2P technology for peers in all communities of a local office is beneficial. However, even in this case, an IPTV service provider could apply other content distribution technologies (i.e., caching or replication) to distribute video files from national offices to the local offices to reduce the load on the uplink of the local office. So, P2P sharing among all communities may not be needed.

From the analysis of the above three cases, the following conclusions may be derived regarding bottlenecks.

P2P technology is useful when some of the network links in FTTN switches or local video hub offices are the bottlenecks. If $B_{1S}$ is the bottleneck, P2P sharing does not help because any peer sharing increases the downlink traffic of the FTTN switch. If $B_{2N}$ is the bottleneck, P2P sharing among viewers in all communities of a local office helps to reduce the load on $B_{2N}$. However, if a service provider can apply other technologies to distribute video files from national head-end offices to the local offices, P2P sharing may not be needed. If $B_{1N}$ or $B_{2S}$ is the bottleneck, P2P sharing within a community reduces the load on the north link of an FTTN switch and its local office. In this case, P2P sharing within a community helps to reduce the load on these congested links. However, P2P sharing across communities increases the possibility that $B_{1N}$ or $B_{2S}$ is a bottleneck. Therefore, P2P sharing across communities should not be used when $B_{1N}$ or $B_{2S}$ is the bottleneck.

Now, to provide good-quality IPTV service, the following network conditions should be met (These constraints are not considered in the cloud model of an IPTV network).

$B_{1S} \geq uk$ $B_{1N} \geq uk$ $B_{2S} \geq nB_{1N} \geq nku$ $N=nk \leq B_{2S}/u$ There are some network constraints for P2P IPTV services. In a physical network environment, all P2P upload traffic has to traverse through all the access switches and service routers that connect the peers. As a result, P2P streaming will increase the load of access switches, local offices and national offices. To guarantee a good video quality, the constraints in FIGS. 3A and 3B should be met.

Compared with conventional IPTV services, P2P sharing within a community may not be beneficial if the south-bound link bandwidth of an access switch is the bottleneck. However, P2P sharing within a community decreases the load on the north-bound link of an access switch as shown in constraint C2 of FIG. 3A. Therefore, P2P sharing within a community will have the most benefit if the infrastructure bottleneck is on the north-bound link bandwidth of an access switch.

Similarly, P2P sharing among peers across communities increases the traffic on both the north-bound links and the south-bound links of access switches. If the network bottleneck is in either $B_{1N}$ or $B_{1S}$, P2P sharing among peers in all communities creates more congestion for the switches and decreases the number of concurrent viewers which can be served by a local office. In this case, P2P sharing across communities is not beneficial for IPTV service providers. Also, if an IPTV service provider can apply content distribution network (CDN) technologies such as caching and replication to reduce the workload in the national head-end office, the benefit of P2P sharing across communities in a VHO is very limited.

Since the benefit of P2P sharing among all communities is limited, P2P sharing within a community is considered in the following. The number of concurrent viewers supported by a local video office, $N(=nk)$, can be increased either by increasing n or k. In practice, the number of communities connected to a local hub office, n, is determined by the number of POPs (point-of-presences) connected to a local office and the number of available locations to install fibers and FTTN switches. Increasing n requires significant planning and capital investment to rent/buy new space to install IPTV network equipment. Therefore, to increase N, it is more economical to increase k. In the following, it is assumed that n is fixed at the time of deployment. In this disclosure, the P2P streaming technology focuses on increasing k to maximize N, the total number of concurrent viewers served by a local office.

Without P2P sharing, the number of concurrent viewers is $$N_{nop2p} = nk_{nop2p} \leq \frac{B_{2S}}{u} \text{ and} \quad (1)$$

$$k_{nop2p} \leq \min\left(\frac{B_{1S}}{u}, \frac{B_{1N}}{u}\right) \quad (2)$$

When the P2P sharing technology of this disclosure is applied, and $k_{p2p}$ is the number of viewers in a community and b is the fraction of these viewers who receive videos from peers instead of streaming servers, then from Constraints 1 and 2 in FIG. 3A, $$N_{p2p} = nk_{p2p} \leq \frac{B_{2S}}{(1-b)u} \text{ and} \quad (3)$$

$$k_{p2p} \leq \min\left(\frac{B_{1S}}{(1+b)u}, \frac{B_{1N}}{(1-b)u}\right) \quad (4)$$

Normally, b increases as k increases, since as k increases, there is a better chance that a video has already been viewed and stored in the set-top boxes of some peers, and a better chance it can be downloaded from a peer. Assuming a model where z is a constant and $b=zk_{p2p}$ when $zk_{p2p}<1$, or $b=1$ otherwise;

representative values of $n=30$ and $z=1.4e-4$ in Eqn. (2) and Eqn. (4) can be picked to see the effect on viewer capacity.

P2P sharing is not beneficial when the $B_{1S}$ value is small. Therefore, the threshold value of $B_{1S}$ should be determined and P2P sharing should only be allowed when the capacity of the south link of a FTTN switch is greater than the threshold value. The P2P streaming algorithm of this disclosure maximizes the number of concurrent viewers in a community by monitoring bandwidth constraints, the network traffic, and the availability of videos in peers.

An insight of this disclosure is that using the "cloud model" for P2P streaming is over simplistic and can be misleading. More reliable results can be obtained by considering the IPTV network at the physical infrastructure level. To demonstrate this point, the following simple P2P algorithm will be considered. The content server receives a request for a video, identifies candidate peers with that video and spare upload capacity, and selects a random set among them to collectively serve the video. If not enough candidates are available to serve the video at its encoding rate, the server tries to serve the remaining portion itself, or denies the request if it cannot. An actual system would use more sophisticated algorithms, but this simple example is sufficient to illustrate the different conclusions that can be drawn under the two models (cloud and physical infrastructure) of the network.

The performance of the system under the two models can be simulated. For the physical model, a slice of the infrastructure of FIG. 1 corresponding to one local office with 20 communities is used and the situation where the content server in the local office distributes video content to the viewers in these communities is considered. For the cloud model, it is assumed that the same content server and viewers are connected via an Internet cloud. The same behavior is assumed for every node in the community—an idle user (i.e., the user not viewing a stream already) requests a stream with probability of 2% every time tick. A time tick occurs every minute. A peer may download only one stream at a time. There are 1000 video programs available for viewing. When a peer issues a request, it selects a program according to Zipf's popularity distribution. Each stream lasts 60 minutes and has a data rate of either 2 Mbps (standard definition TV) or 6 Mbps (HDTV). Once downloaded, the program remains available at the peer for a period called the stream time-to-live (stream TTL) with a default value of 1000 minutes. A peer may be turned off and on by its user. An operational peer is turned off with probability 0.1% on every time tick, and a non-operational peer is turned on with probability 0.5% on every tick. This means that on average every peer stays on five times longer than it stays off. It is further assumed that $B_{1N}$=0.622 G (OC-12) and $B_{2S}$=10 G. Each data point in the graphs throughout the paper is obtained by running the simulation program over 5000 time clicks and taking the average over the last 2500 time ticks (when the system reached a steady state in all the experiments).

There are several novel aspects of the P2P video sharing algorithm of this disclosure. For example, the algorithm explicitly takes into account the capacity limitations of the underlying physical network infrastructure, not the overlay network of peers as in other systems. Also, to avoid a long delay before the start of the requested program, the algorithm allocates enough supporting peers to collectively serve a video at or above the stream encoding rate, while at the same time ensuring that each peer upload rate does not exceed its uplink capacity. Additionally, unlike existing streaming P2P approaches that deal with peer disconnections by special stream encodings that either add redundancy or gracefully degrade stream quality in response to failures (referred to as passive error handling), in the algorithm of this disclosure, the local office either substitutes a failed peer with a different peer or serves the missing content itself, thereby utilizing active error handling.

Since the inventors have discovered that P2P sharing is mostly beneficial within a community and may actually be detrimental for cross-community or global sharing, the disclosure herein concentrates on P2P sharing within a single community. In the disclosed P2P algorithm, the local office server maintains full information about each community, including which viewers are currently watching which programs, which programs are available for upload from each peer, the current uplink and downlink bandwidth consumption by each peer and each FTTN switch, and the total load on the office communication links. Viewers send to the office two kinds of requests—ProcessRequest requests a stream and ReplacePeer indicates that one of the peers serving them failed. These requests are processed according to the following algorithm:

```
ProcessRequest(Stream S, Viewer V)
// Request for stream S received from viewer V
    If the FTTN switch of the viewer satisfies Constraint 1
    with S_c = S_c + 1 and k = k + 1
        PeerSet = SelectPeers(S)
        // Find a set of peers in the viewer's community to serve request
        If PeerSet ≠ Ø
            Send message UsePeers(EncodingRate(S),PeerSet) to viewer V
            terminate
        endif
    endif
    if there is enough total office download capacity
    and bandwidth of link to the viewer's FTTN switch
        Serve stream S to viewer V directly
    else
        Send RequestDenied( ) to viewer V
end
```

```
ReplacePeer(Viewer V, Peer P)
// Request to replace a failed peer P from viewer V
    Let S be the stream being viewed by V,
    and n be the number of peers serving the stream to V.
    P' = FindPeer(S);
    if P' ≠ NULL
        send ReplacementPeer(P') to V
    elseif there is enough total office download capacity
    and bandwidth of link to the viewer's FTTN switch
        send UseOffice( ) to V // In response, V will request stream segments
            that peer P used to serve from the office directly
    endif
end
```

When the client receives a UsePeers message, it divides the streaming rate equally among the peers, calculates which stream segments to request from each peer and the necessary buffering before starting to render the stream, and sends the appropriate requests to the peers.

The most intricate part of the algorithm is the implementation of the SelectPeers and FindPeer functions. A difficulty arises if a peer able to serve rare content is already assigned to serve more commonly available content. Because of the severely limited uplink capacity, it will not be able to serve more than one video. This leads to the need to dynamically reassign peers to viewers. This reassignment will occur transparently to the viewer. For example, consider peers P1, P2, P3, and P4 and let P1 and P2 have two streams, A and B, and P3 and P4 only have stream A. Assume a viewer requested stream A and the server chose peers P1 and P2 to serve it. If another viewer requests stream B, without dynamic reassignments, Peers P1 and P2 are unable to serve it because their capacity is used up; the server would have to serve the new viewer directly. However, if the server reassigns the first viewer to peers P3 and P4, the second viewer can be served by P1 and P2. Selecting peers for a given request may trigger cascading reassignment of previously selected peers, or global scheduling of all currently served streams among all the peers, which could cause long delays potentially exceeding clients' buffer capacity. To avoid such global scheduling, the SelectPeers algorithm resorts to heuristics. The main points of the SelectPeers algorithm are as follows.

Given current values for the peer uplink capacity (1 Mbps) and stream encoding rates of 2 Mbps and 6 Mbps, it can be assumed that peer uplink capacity is less than the stream coding rate. The SelectPeers algorithm attempts to select the fewest peers with sufficient aggregate uplink capacity for serving the stream. In particular, together with the previous assumption, this means that each peer can upload to only one viewer at a time.

When more than enough free (i.e., assigned) peers with the requested stream exist, n peers are selected, where n=Rate(S)/$B_{OU}$, as follows. Let $S_{max}(P)$ be the most popular stream among streams stored at peer P. Then, n peers P are selected with the least popular streams $S_{max(P)}$, among all the candidate peers. The rationale is that peers whose most popular stream is not very popular will probably not need to serve a future request.

When not enough free peers exist, an attempt is made to free up additional peers by reassigning the streams they currently serve to other peers. Let P be the set of busy peers that have the requested stream and m be the number of peers needed to be freed up. The algorithm tries to free the m peers in the decreasing order of the popularity of the streams they are currently serving. The rationale behind this heuristic is that the more popular the currently served stream is, the more likely it is to find another peer that could take over this stream's delivery. Thus, the algorithm sorts peers in P in the decreasing order of popularity of the streams they are currently serving, and then for each peer P in the list, attempts to find an idle peer that has the stream being served by P. This step completes once the first m peers are freed up, or until it went through the entire candidate list P, in which case the algorithm returns a failure (and empty peer set). If the overall set of n peers for a requested stream have been found, the viewers of reassigned streams are notified to switch to new peers.

An algorithm will now be disclosed for deciding which streams to serve from the local office and which from peers, and for peer selection. The algorithm described above considered limitations of the physical network infrastructure. The current algorithm inherits that basic approach, including the consideration of the physical infrastructure, the avoidance of a long delay before the start of the requested program by allocating enough peers to collectively serve a video at or above the stream encoding rate, and the active error handling, which involves dynamically replacing failed peers with other peers capable to serve the missing content, or serving the missing content from the office. At the same time, the new algorithm differs from the algorithm disclosed above in at least three aspects. First, the new algorithm introduces an asynchronous office offloading mechanism to prevent the servers from being overloaded. Second, the new algorithm allows a request to be served partly by peers and partly by the office, whereas in the previously disclosed algorithm the request is served either entirely from peers or entirely from the office, but not a combination of both. Third, the new algorithm attempts to maximize profit as well as system capacity, and hence is biased toward serving viewers from the server (an approach referred to as "server-first") while the previously disclosed algorithm preferred the peers (an approach referred to as "peers-first"). While both server-first and peer-first approaches achieve similar system capacity, the server-first approach can result in higher profit. One reason for this is that by using the server, incentive payments to peers can be reduced or eliminated.

In the new algorithm, a local office maintains states on viewers in its network, including which viewers are watching which programs, which programs are available for upload from each peer, the current uplink and downlink bandwidth consumption by each peer and each access switch, and the total load on the office communication links.

The algorithm uses high and low watermarks for the office load. The high watermark is set to allow the office to serve at least one more stream. Thus, if a stream request finds the office at below high watermark, the request can be served by the office. Viewers (STBs) send to the office two kind of requests: ProcessRequest requests a stream and ReplacePeer indicates that one of the peers serving them failed. In addition, the office may receive an OffloadOffice request from the load monitoring subsystem. The office processes these messages according to the algorithm shown below:

---

ProcessRequest(Stream S, Viewer V)
// Request for stream S received from viewer V
   Input: $v^{old}$ - total number of viewers in the community before
        current request:
           $B_{peers}^{old}$ - total rate obtained by viewers from community peers
   If officeLoad > HW OR offloading is TRUE
     // Try to use peers first
     // Find the max additional bandwidth that peers can serve
     $B_{peers}^{max} = B_{1s} - (v^{old} + 1)u - B_{peers}^{old}$
     (PeerSet, $B_{peers}$)=
     SelectPeers(C,S,min{EncodingRate(S),$B_{peers}^{max}$})
     Try to find a set of peers in the viewer's community C to
        serve the portion of stream S subject to bandwidth restrictions
     // Find the rate of the part of stream S to be served by office
     $B_{S,office}$ = EncodingRate(S) - $B_{peers}$
     If there is enough total office download capacity and bandwidth
       of link to the viewer's access switch to serve $B_{S,office}$ rate
       Send message UsePeers(EncodingRate(S), $B_{peers}$, PeerSet) to
         viewer V
     else
       Send RequestDenied( ) to viewer V
     endif
   else
     // Use office; we know the office has enough capacity
     Serve stream S to viewer V directly
   endif
end

---

ReplacePeer(Viewer V, Peer P)
// Request to replace a failed peer P from viewer V
   Let S be the stream being viewed by V, and n be the
      number of peers serving S to V.
   P' = FindPeer(S);
   if P' ≠ NULL
     send ReplacementPeer(P') to V
   elseif there is enough total office download capacity
      and bandwidth of link to the viewer's access switch
     send UseOffice( ) to V // In response, V will request stream
       segments that peer P used to serve from the office directly
   else
     send RequestDenied( ) to viewer V
   endif
end

---

Upon receiving a ProcessRequest message from a user, the server first checks if it has enough capacity to serve the stream. If so, it services the request. Otherwise, it identifies the maximum rate that can be served by neighborhood peers as follows. Let $v^{old}$ be the total number of concurrent viewers before the current request, and $B_{peers}^{old}$ be the total rate obtained by viewers in this community from their community peers. Let $B_{peers}$ be the (sub)stream rate peers would serve to the current requester. Because the content downloaded from the peers consumes the south-side bandwidth of the access switch twice, the total bandwidth consumed after the new request is satisfied, is $(v^{old}+1)u$ due to download by viewers, plus $B_{peers}^{old}+B_{peers}$ due to upload by peers. Since the total consumption must be within $B_{1s}$, there is the expression for $B_{peers}^{max}$, the maximum rate of the new stream that can be served by peers in the ProcessRequest procedure.

After finding $B_{peers}^{max}$, the server attempts to find peers that have the requested stream and spare uplink capacity to serve it, using a call to SelectPeers (described below). In doing so, in this embodiment, it only considers the peers from the same community as the requesting viewer, because as discussed above P2P sharing is mostly beneficial within a community and it may be detrimental for cross-community or global sharing. SelectPeers accepts as parameters the community where to find the peers, the stream to be served, and the total rate to be served by the peers, and returns the set of such peers, which may or may not be sufficient to serve the entire stream, and the total rate these peers can serve. If the office has the capacity to serve the rest of the stream, it sends the UsePeers message to the client, specifying the encoding rate of the stream and the peer set to use. The client will then calculate stream segments to be obtained from each peer and the office and send the appropriate requests to the peers. Note that obtaining stream segments independently is possible due to independent encoding of each streaming video packet (e.g., Microsoft Active Streaming Format).

An asynchronous monitoring subsystem triggers the Off-loadOffice procedure when the server load reaches high watermark. The procedure attempts to reassign streams delivery from the server to peers, taking care to only select peers from the same community as the viewer. The algorithm itself is similar to finding peers in ProcessRequest procedure.

---

OffloadOffice( )
Invoked any time monitoring systems detect officeLoad > HW
    offloading = TRUE;
    for each stream S office is currently serving, in the
        decreasing order of S popularity
        for each community C receiving S from office
            Let v be number of viewers in C before current request
            Let $B_{peers}^{old}$ be total rate obtained by viewers from peers
            // Find the max additional bandwidth that peers can serve
            $B_{peers}^{max} = B_{1s} - vu - B_{peers}^{old}$
            for each viewer V in C receiving S from office, in the decreasing
                order of the fraction of S served by office
                let $S_{office}^{old}$ be the download rate of viewer V from office
                    due to stream S
                // Find peers in community C to take over from office
                (PeerSet, $B_{peers}^{new}$ )=
                    SelectPeers(C,S,min$\{S_{office}^{old}, B_{peers}^{max}\}$)
                stream S subject to maximum bandwidth restriction
                if PeerSet is empty break; // Break from the inner loop
                // Find new rate of the part of S to be served by office
                $B_{S,office}^{new}$ =
                $S_{office}^{old} - B_{peers}^{new}$
                send message SwitchToPeers(S, $B_{peers}^{new}$, PeerSet) to V
                officeLoad = officeLoad − $B_{peers}^{new}$
                if officeLoad < LW
                    offloading = FALSE
                    terminate
                endif
            endfor
        endfor
endfor

---

The SelectPeer algorithm was previously described above. The FindPeer algorithm is a specialization of SelectPeers and is not described further. For the sake of completeness, it is described it in full here. Given the current values for the peer uplink capacity (1 Mbps) and stream encoding rates (2 Mbps and 6 Mbps), the algorithm assumes peer uplink capacity is less than the stream coding rate. Furthermore, for ease of management, the algorithm attempts to minimize the number of peers for serving any given stream. Together with the previous assumption, this means that each peer can upload to only one viewer at a time, and when it does, it utilizes its full upload capacity. The algorithm is as follows.

---

SelectPeers(Community C, Stream S, Rate R)
    let F be the available (i.e., unassigned) peers with stream S
    let n = $R/B_{ON}$ be the number of peers required
    if n $\leq$ |F| // if we have more than enough available peers
        // Select n available peers
        Let $S_{max}(P)$ be the most popular stream that peer P has
        ReturSet = $\{P_1, \ldots, P_n\}$ - set of n peers $P_i$ with
            the least popular streams $S_{max}(P)$, among peers in F.
    else
        let m = |F|-n be the number of additional peers
            we must find
        let P be the set of busy peers that have stream S
        sort peers in P in the decreasing order of popularity of streams
            the peers are serving
        ReturnSet = ∅
        for each P in P in the decreasing order of popularity
            of currently served stream CurStream(P)
            if there is an available peer P' that has CurStream(P)
                reassign viewer served by peer P to peer P'
                Add peer P to ReturnSet
                if |ReturnSet| = m
                    break
                endif
            endif
        endfor
    endif
    return(ReturnSet, |ReturnSet| * $B_{ON}$)
end

---

Selecting peers for a given request may trigger cascading reassignment of previously selected peers, or global scheduling of all currently served streams among all the peers, which could cause long delays potentially exceeding clients' buffer capacity. To avoid such global scheduling, the SelectPeers algorithm resorts to two heuristics. First, when there are more than enough available peers with the needed stream the algorithm favors peers whose most popular stored streams are not very popular. The rationale is that peers whose most popular stream is not very popular will probably not need to serve a future request. Second, when there are not enough available peers, the algorithm tries to free up peers in the decreasing order of the popularity of the streams they are currently serving. The hope is that the more popular the currently served stream is, the more likely it is to find another peer that could take over this stream's delivery. The algorithm never performs cascading reassignment. If no peer exists to take over from the peer being freed, the algorithm gives up trying to free up this peer and attempts to free up the next peer on the candidate list. In all cases the algorithm returns the peers found as well as the total rate they will be serving, which is the number of selected peers times $B_{O,N}$, according to the assumption that every peer always serves one viewer at full upload capacity.

Figure 4:
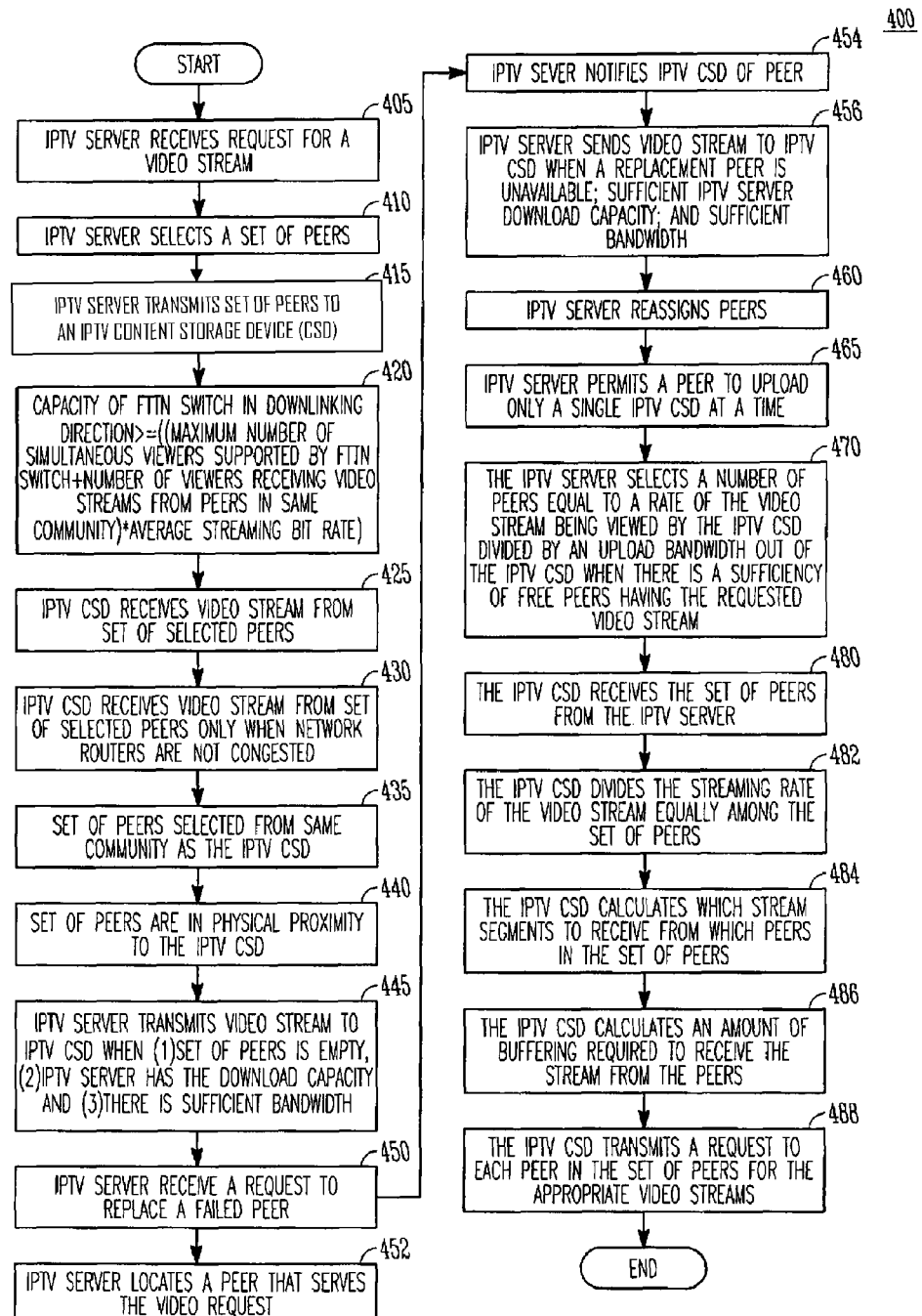
FIG. 4 illustrates a flowchart of an example process for Peer to Peer sharing in an IPTV network.

FIG. 4 illustrates a flowchart of an example process 400 for Peer to Peer sharing in an IPTV network. At 405, an IPTV server receives a request from an IPTV content storage device (CSD) to view a video stream. At 410, the IPTV server selects a set of peers for the IPTV CSD. At 415, the IPTV server transmits the set of peers to the IPTV CSD. At 420, a capacity of a fiber to the node (FTTN) switch in a down linking direction is greater than or equal to a sum of a maximum number of simultaneous viewers supported by the FTTN switch plus a number of viewers that receive video streams from peers in the same community, the sum being multiplied by an average streaming bit rate for the video stream.

At 425, the IPTV CSD receives the video stream from one or more peers selected from the set of peers, and at 430, the IPTV CSD receives the video stream from one or more peers selected from the set of peers only when network routers coupling the IPTV server to the IPTV CSD are not congested. At 435, the set of peers for the IPTV CSD is selected from the same community as the IPTV CSD, and at 440, the set of peers for the IPTV CSD are in physical proximity to the IPTV CSD.

At 445, the IPTV server transmits a video stream to the IPTV CSD when the set of peers is empty, the IPTV server has the download capacity, and there is sufficient bandwidth on a link between the IPTV server and the FTTN switch. At 450, the IPTV server receives from the IPTV CSD a request to replace a failed peer. At 452, the IPTV server locates a peer for the IPTV CSD that serves the video stream that the IPTV CSD is receiving. At 454, the IPTV server notifies the IPTV CSD of a peer from which the IPTV CSD can receive the video stream, and 456, the IPTV server sends the video stream to the IPTV CSD when a replacement peer is unavailable, there is a sufficient amount of IPTV server download capacity, and there is sufficient bandwidth between the IPTV server and the FTTN switch.

At 460, the IPTV server reassigns peers when an already assigned peer capable of serving a particular video content is needed by another IPTV CSD. At 465, the IPTV server permits a peer to upload only a single IPTV CSD at a time, and at 470, the IPTV server selects a number of peers equal to a rate of the video stream being viewed by the IPTV CSD divided by an upload bandwidth out of the IPTV CSD when there is a sufficiency of free peers having the requested video stream.

At 480, the IPTV CSD receives the set of peers from the IPTV server. At 482, the IPTV CSD divides the streaming rate of the video stream equally among the set of peers. At 484, the IPTV CSD calculates which stream segments to receive from which peers in the set of peers, and at 486, it calculates an amount of buffering required to receive the stream from the peers. At 488, the IPTV CSD transmits a request to each peer in the set of peers for the appropriate video streams.

Figure 5A:
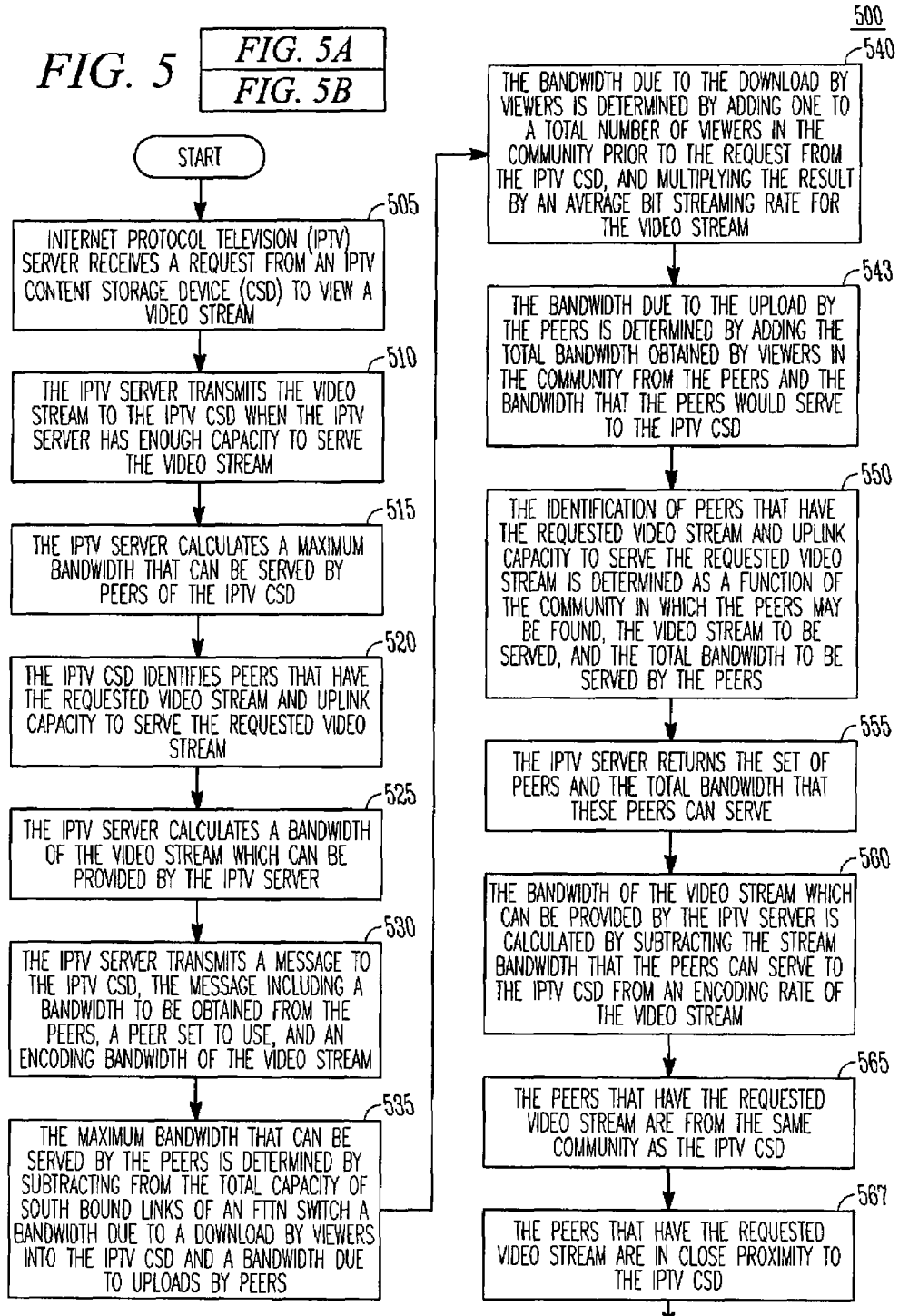
FIGS. 5A and 5B illustrate a flowchart of another example process for Peer to Peer sharing in an IPTV network.
Figure 5B:
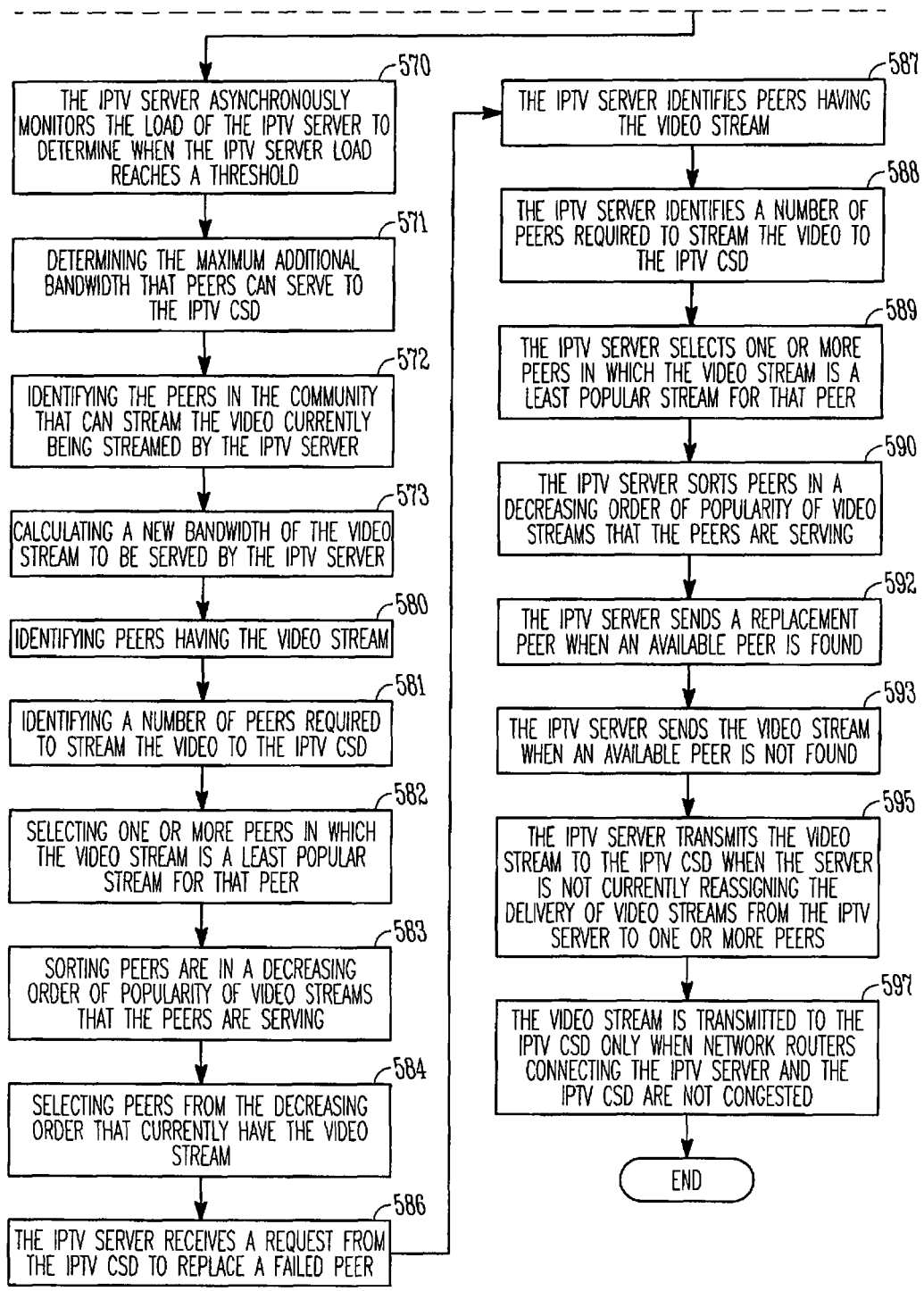

FIG. 5, which includes FIGS. 5A and 5B, illustrates a flowchart of another example process 500 for Peer to Peer sharing in an IPTV network. At 505, an Internet Protocol Television (IPTV) server receives a request from an IPTV content storage device (CSD) to view a video stream. At 510, the IPTV server transmits the video stream to the IPTV CSD when the IPTV server has enough capacity to serve the video stream. At 515, the IPTV server calculates a maximum bandwidth that can be served by peers of the IPTV CSD, and at 520, it identifies peers that have the requested video stream and uplink capacity to serve the requested video stream. At 525, the IPTV server calculates a bandwidth of the video stream which can be provided by the IPTV server, and at 530, the IPTV server transmits a message to the IPTV CSD, the message including a bandwidth to be obtained from the peers, a peer set to use, and an encoding bandwidth of the video stream.

At 535, the maximum bandwidth that can be served by the peers is determined by subtracting from the total capacity of south bound links of an FTTN switch a bandwidth due to a download by viewers into the IPTV CSD and a bandwidth due to uploads by peers. At 540, the bandwidth due to the download by viewers is determined by adding one to a total number of viewers in the community prior to the request from the IPTV CSD, and multiplying the result by an average bit streaming rate for the video stream. At 543, the bandwidth due to the upload by the peers is determined by adding the total bandwidth obtained by viewers in the community from the peers and the bandwidth that the peers would serve to the IPTV CSD.

At 550, the identification of peers that have the requested video stream and uplink capacity to serve the requested video stream is determined as a function of the community in which the peers may be found, the video stream to be served, and the total bandwidth to be served by the peers. At 555, the IPTV server returns the set of peers and the total bandwidth that these peers can serve. At 560, the bandwidth of the video stream which can be provided by the IPTV server is calculated by subtracting the stream bandwidth that the peers can serve to the IPTV CSD from an encoding rate of the video stream. At 565, the peers that have the requested video stream are from the same community as the IPTV CSD, and at 567, the peers that have the requested video stream are in close proximity to the IPTV CSD.

At 570, the IPTV server asynchronously monitors the load of the IPTV server to determine when the IPTV server load reaches a threshold. The asynchronous monitoring includes at 571, determining the maximum additional bandwidth that peers can serve to the IPTV CSD, at 572, identifying the peers in the community that can stream the video currently being streamed by the IPTV server, and at 573, calculating a new bandwidth of the video stream to be served by the IPTV server.

The identification of peers includes at 580, identifying peers having the video stream, at 581, identifying a number of peers required to stream the video to the IPTV CSD, at 582, selecting one or more peers in which the video stream is a least popular stream for that peer, at 583, sorting peers in a decreasing order of popularity of video streams that the peers are serving, and at 584, selecting peers from the decreasing order that currently have the video stream.

At 586, the IPTV server receives a request from the IPTV CSD to replace a failed peer. At 587, the IPTV server identifies peers having the video stream. At 588, the IPTV server identifies a number of peers required to stream the video to the IPTV CSD. At 589, the IPTV sever selects one or more peers in which the video stream is a least popular stream for that peer. At 590, the IPTV server sorts peers in a decreasing order of popularity of video streams that the peers are serving. At 592, the IPTV server sends a replacement peer when an available peer is found, and at 593, it sends the video stream when an available peer is not found.

At 595, the IPTV server transmits the video stream to the IPTV CSD when the server is not currently reassigning the delivery of video streams from the IPTV server to one or more peers, and at 597, the video stream is transmitted to the IPTV CSD only when network routers connecting the IPTV server and the IPTV CSD are not congested.

Figure 6:
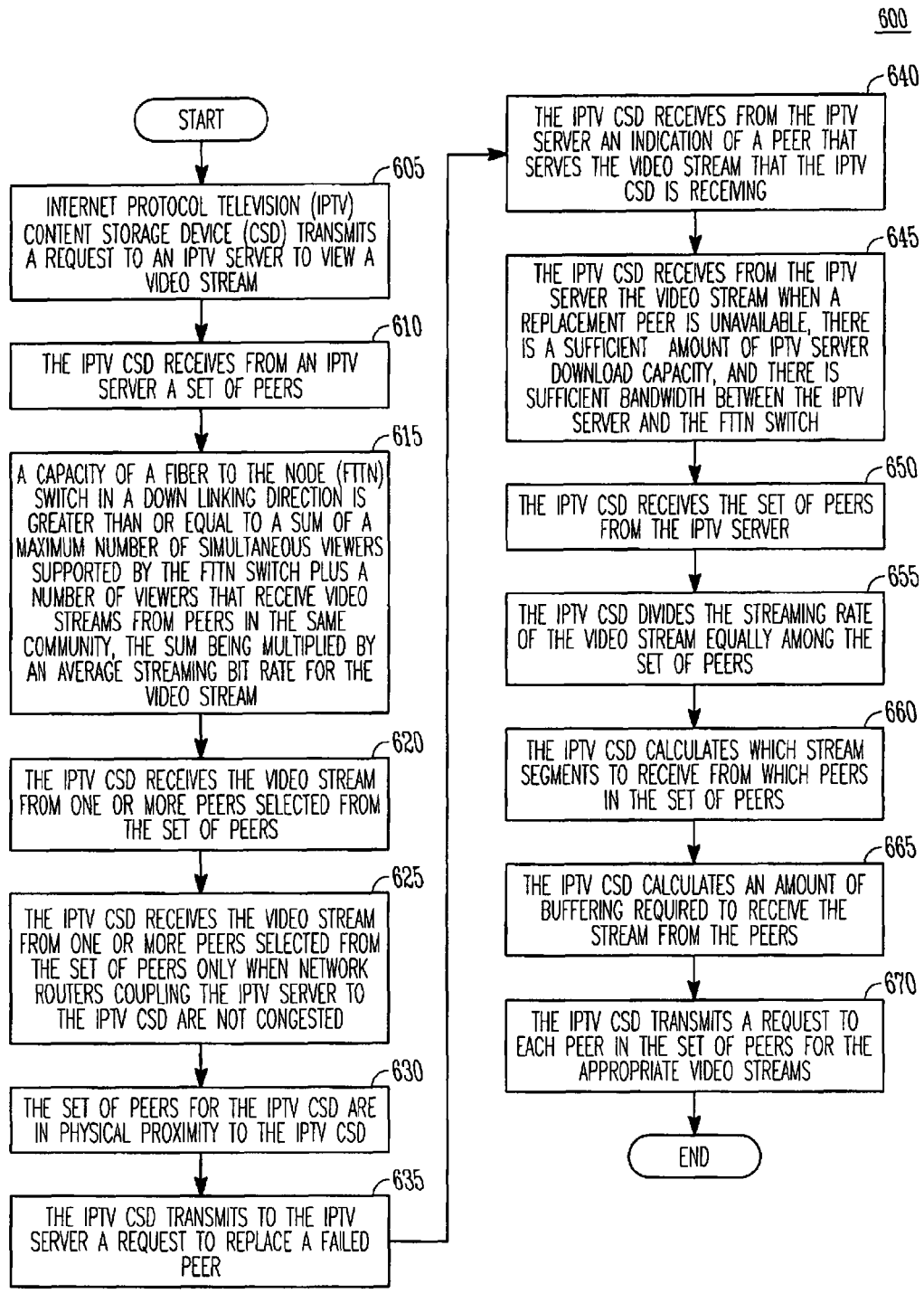
FIG. 6 illustrates a flowchart of an example process for Peer to Peer sharing in an IPTV network.

FIG. 6 illustrates a flowchart of another example process 600 for Peer to Peer sharing in an IPTV network. The process 600 includes, at 605, an Internet Protocol Television (IPTV) content storage device (CSD) transmitting a request to an IPTV server to view a video stream. At 610, the IPTV CSD receives from an IPTV server a set of peers. At 615, a capacity of a fiber to the node (FTTN) switch in a down linking direction is greater than or equal to a sum of a maximum number of simultaneous viewers supported by the FTTN switch plus a number of viewers that receive video streams from peers in the same community, the sum being multiplied by an average streaming bit rate for the video stream.

At 620, the IPTV CSD receives the video stream from one or more peers selected from the set of peers, and at 625, the IPTV CSD receives the video stream from one or more peers selected from the set of peers only when network routers coupling the IPTV server to the IPTV CSD are not congested. At 630, the set of peers for the IPTV CSD are in physical proximity to the IPTV CSD.

At 635, the IPTV CSD transmits to the IPTV server a request to replace a failed peer. At 640, the IPTV CSD receives from the IPTV server an indication of a peer that serves the video stream that the IPTV CSD is receiving. At 645, the IPTV CSD receives from the IPTV server the video stream when a replacement peer is unavailable, there is a sufficient amount of IPTV server download capacity, and there is sufficient bandwidth between the IPTV server and the FTTN switch.

At 650, the IPTV CSD receives the set of peers from the IPTV server. At 655, the IPTV CSD divides the streaming rate of the video stream equally among the set of peers. At 660, the IPTV CSD calculates which stream segments to receive from which peers in the set of peers. At 665, the IPTV CSD calculates an amount of buffering required to receive the stream from the peers, and at 670, the IPTV CSD transmits a request to each peer in the set of peers for the appropriate video streams.

Figure 7:
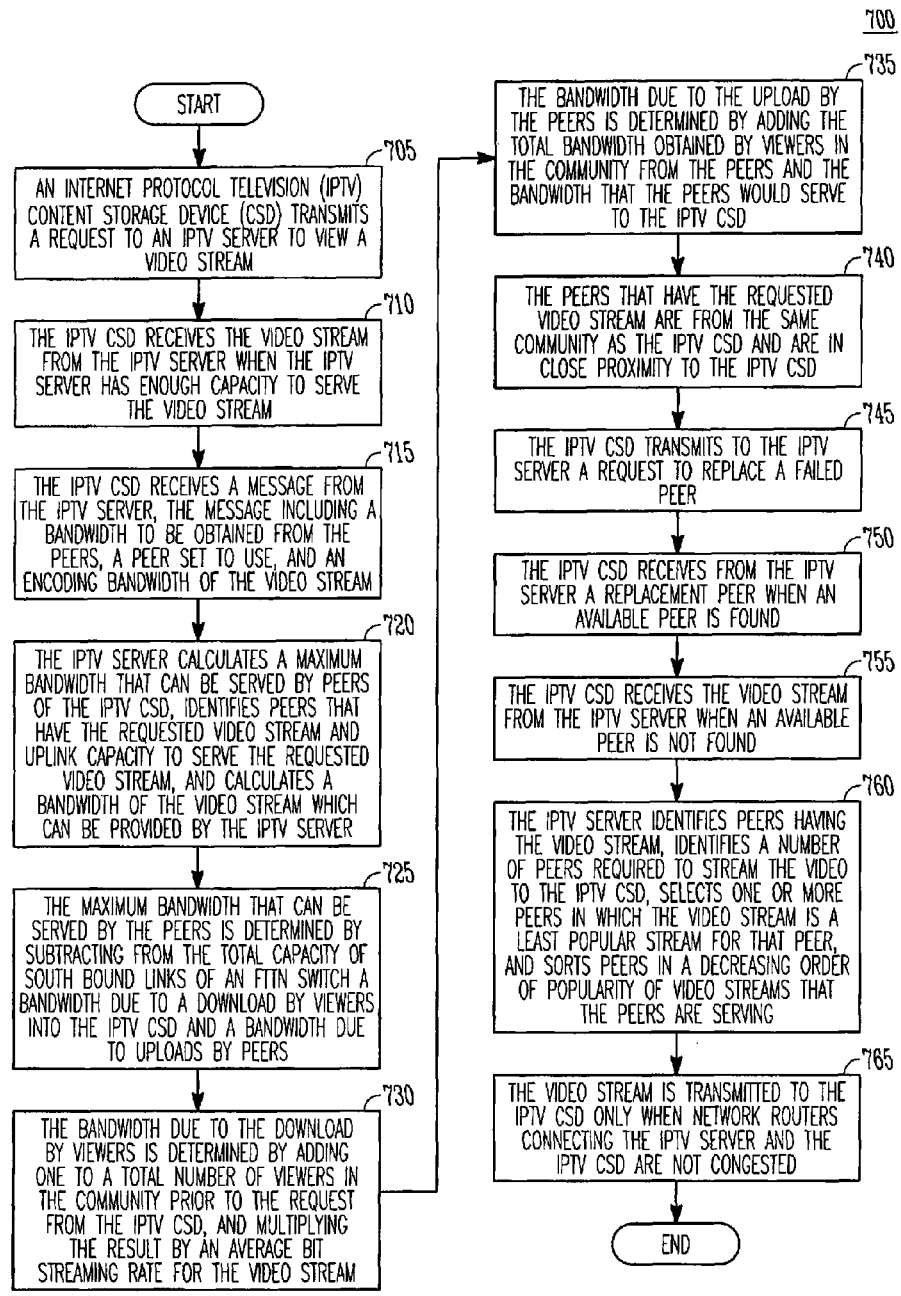
FIG. 7 illustrates a flowchart of an example process for Peer to Peer sharing in an IPTV network.

FIG. 7 illustrates a flowchart of another example process 700 for Peer to Peer sharing in an IPTV network. The process 700 includes at 705, an Internet Protocol Television (IPTV) content storage device (CSD) transmitting a request to an IPTV server to view a video stream. At 710, the IPTV CSD receives the video stream from the IPTV server when the IPTV server has enough capacity to serve the video stream. At 715, the IPTV CSD receives a message from the IPTV server, the message including a bandwidth to be obtained from the peers, a peer set to use, and an encoding bandwidth of the video stream. At 720, the IPTV server calculates a maximum bandwidth that can be served by peers of the IPTV CSD, identifies peers that have the requested video stream and uplink capacity to serve the requested video stream, and calculates a bandwidth of the video stream which can be provided by the IPTV server.

At 725, the maximum bandwidth that can be served by the peers is determined by subtracting from the total capacity of south bound links of an FTTN switch a bandwidth due to a download by viewers into the IPTV CSD and a bandwidth due to uploads by peers. At 730, the bandwidth due to the download by viewers is determined by adding one to a total number of viewers in the community prior to the request from the IPTV CSD, and multiplying the result by an average bit streaming rate for the video stream. At 735, the bandwidth due to the upload by the peers is determined by adding the total bandwidth obtained by viewers in the community from the peers and the bandwidth that the peers would serve to the IPTV CSD.

At 740, the peers that have the requested video stream are from the same community as the IPTV CSD and are in close proximity to the IPTV CSD. At 745, the IPTV CSD transmits to the IPTV server a request to replace a failed peer. At 750, the IPTV CSD receives from the IPTV server a replacement peer when an available peer is found. At 755, the IPTV CSD receives the video stream from the IPTV server when an available peer is not found. At 760, the IPTV server identifies peers having the video stream, identifies a number of peers required to stream the video to the IPTV CSD, selects one or more peers in which the video stream is a least popular stream for that peer, and sorts peers in a decreasing order of popularity of video streams that the peers are serving. At 765, the video stream is transmitted to the IPTV CSD only when network routers connecting the IPTV server and the IPTV CSD are not congested.

It is to be understood that the above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

In the above detailed description of embodiments of the disclosure, various features are grouped together in one or more embodiments for streamlining the disclosure. This is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments, with each claim standing on its own as a separate embodiment. It is understood that the above description is intended to be illustrative, and not restrictive. It is intended to cover all alternatives, modifications and equivalents as may be included within the scope of the disclosure as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A system comprising an Internet Protocol Television (IPTV)
server configured to:
receive a request from an IPTV content storage device (CSD) to view a video stream; select a set of peers for the IPTV CSD; and permit a particular peer to upload only a single IPTV CSD at a time; and select a number of the peers from the set of peers equal to a rate of the video stream being viewed by the IPTV CSD divided by an upload bandwidth out of the IPTV CSD when there is a sufficiency of free peers having the requested video stream: transmit the set of peers to the IPTV CSD;
wherein the IPTV server further comprises a configuration to reassign a number of the peers from the set of peers when an already assigned peer that is capable of serving a particular video content is in use by another IPTV CSD;
wherein a capacity of a fiber to the node (FTTN) switch in a down linking direction is greater than or equal to a sum of a number of simultaneous viewers supported by the FTTN switch plus a number of viewers that receive additional video streams from peers in a same community.

2. The system of claim 1, wherein the number of simultaneous viewers comprises a maximum number of simultaneous viewers, and wherein the sum is multiplied by an average streaming bit rate for the video stream.

3. The system of claim 1, wherein the IPTV CSD includes one or more of an IPTV Set Top Box (STB), a personal computer, and a network storage device.

4. The system of claim 1, wherein the IPTV CSD receives the video stream from one or more peers selected from the set of peers.

5. The system of claim 4, wherein the IPTV CSD receives the video stream from one or more peers selected from the set of peers when network routers coupling the IPTV server to the IPTV CSD are not congested.

6. The system of claim 1, wherein the set of peers for the IPTV CSD is selected from a same community as the IPTV CSD.

7. The system of claim 6, wherein the set of peers for the IPTV CSD is in proximity to the IPTV CSD.

8. The system of claim 1, wherein the IPTV server further comprises a configuration to transmit the video stream to the IPTV CSD when the set of peers is empty, when the IPTV server has the download capacity, and when there is sufficient bandwidth on a link between the IPTV server and the FTTN switch.

9. The system of claim 1, wherein the IPTV server comprises one or more of a national head office and a local video hub office.

10. The system of claim 1, wherein the IPTV server further comprises a configuration to:
receive from the IPTV CSD a request to replace a failed peer;
locate a particular peer from the set of peers for the IPTV CSD that distributes the video stream that the IPTV CSD is receiving;
notify the IPTV CSD of the particular peer from which the IPTV CSD can receive the video stream; and
send the video stream to the IPTV CSD when a particular peer from the set of peers is unavailable, when there is a sufficient amount of IPTV server download capacity, and when there is sufficient bandwidth between the IPTV server and the FTTN switch.

11. The system of claim 1, wherein the IPTV CSD comprises a configuration to:
receive the set of peers from the IPTV server;
divide the streaming rate of the video stream equally among the set of peers;
calculate which stream segments to receive from which peers in the set of peers;
calculate an amount of buffering required to receive the stream from the peers; and
transmit a request to each peer in the set of peers for the appropriate video streams.

12. A system comprising an Internet Protocol Television (IPTV) server configured to:
receive a request from an IPTV content storage device (CSD) to view a video stream;
transmit the video stream to the IPTV CSD when the IPTV server has enough bandwidth to serve the video stream;
calculate a maximum peer bandwidth that can be distributed by peers of the IPTV CSD;
identify peers that have the video stream and uplink capacity to distribute the requested video stream;
calculate a second server bandwidth of the video stream which can be provided by the IPTV server; and
transmit a message to the IPTV CSD, the message including a bandwidth to be obtained from the peers, a peer set to use, and an encoding bandwidth of the video stream;
wherein the maximum peer bandwidth that can be distributed by the peers is determined by subtracting from a total capacity associated with south bound links of an FTTN switch, a download bandwidth due to a download by viewers into the IPTV CSD, and an upload bandwidth due to uploads by peers;
wherein a download bandwidth due to a download by viewers is determined by adding one to a total number of viewers in a community prior to the request from the IPTV CSD, and multiplying the result by an average bit streaming rate for the video stream and an upload bandwidth due to an upload by the peers is determined by adding a total bandwidth obtained by viewers in the community from the peers and a bandwidth that the peers would distribute to the IPTV CSD.

13. The system of claim 12, wherein the IPTV CSD includes one or more of an IPTV Set Top Box (STB), a personal computer, and a network storage device.

14. The system of claim 12, wherein the identification of peers that have the video stream and uplink capacity to distribute the video stream is determined as a function of a community in which the peers can be found, the video stream to be distributed, and a total bandwidth to be distributed by the peers.

15. The system of claim 12, wherein the encoding bandwidth of the video stream which can be provided by the IPTV server is calculated by subtracting a stream bandwidth that the peers can distribute to the IPTV CSD from an encoding rate of the video stream.

16. The system of claim 12, wherein the peers that have the video stream are from a same community as that of the IPTV CSD.

17. The system of claim 16, wherein the peers that have the video stream are in proximity to the IPTV CSD.

18. The system of claim 12, wherein the IPTV server further comprises a configuration to asynchronously monitor a processing load of the IPTV server to determine when the IPTV server load reaches a threshold.

19. The system of claim 18, wherein the asynchronous monitoring comprises a configuration to:
determine a maximum additional bandwidth that peers can distribute to the IPTV CSD;
identify peers in a community that can stream the video currently being streamed by the IPTV server; and
calculate a new bandwidth of the video stream to be distributed by the IPTV server.

20. The system of claim 12, wherein the identification of peers comprises a configuration to:
identify particular peers having the video stream;
identify a number of the particular peers to use to stream the video to the IPTV CSD;
select one or more of the particular peers in which the video stream is a least popular stream for those selected peers;
sort the particular peers in a decreasing order of popularity of other video streams that the peers are serving; and
select the peers from the decreasing order of the particular peers that currently have the video stream.

21. The system of claim 12, wherein the IPTV server further comprises a configuration to:
receive a request from the IPTV CSD to replace a failed peer;
identify particular peers having the video stream;
identify a number of the particular peers to use to stream the video to the IPTV CSD;
select one or more of the particular peers in which the video stream is a least popular stream for those particular peers;

sort the particular peers in a decreasing order of popularity of video streams that the peers are serving;

send a replacement peer when an available peer is found; and sending the video stream from the IPTV server when an available peer is not found.

22. The system of claim 12, wherein the IPTV server further comprises a configuration to transmit the video stream to the IPTV CSD when the server is not currently reassigning delivery of video streams from the IPTV server to one or more peers in the peer set to use.

23. The system of claim 12, wherein the IPTV server further comprises a configuration to transmit the video stream to the IPTV CSD when network routers connecting the IPTV server and the IPTV CSD have sufficient capacity.

24. A system comprising an Internet Protocol Television (IPTV) content storage device (CSD) configured to:

transmit a request to an IPTV server to view a video stream; and receive from the IPTV server a set of peers from which to acquire the video stream;

wherein a capacity of a fiber to the node (FTTN) switch in a down linking direction is greater than or equal to a sum of a number of simultaneous viewers supported by the FTTN switch plus a number of viewers that receive video streams from peers in a same community;

wherein a maximum peer bandwidth that can be distributed by the peers is determined by subtracting from a total capacity associated with south bound links of the FTTN switch, a download bandwidth due to a download by viewers into the IPTV CSD, and an upload bandwidth due to uploads by peers;

wherein a download bandwidth due to a download by viewers is determined by adding one to a total number of viewers in a community prior to the request from the IPTV CSD, and multiplying the result by an average bit streaming rate for the video stream; and wherein an upload bandwidth due to an upload by the peers is determined by adding a total bandwidth obtained by viewers in the community from the peers and a bandwidth that the peers would distribute to the IPTV CSD.

25. The system of claim 24, wherein the number of simultaneous viewers comprises a maximum number of simultaneous viewers, and wherein the sum is multiplied by an average streaming bit rate for the video stream.

26. The system of claim 25, wherein the IPTV CSD further comprises a configuration to receive the video stream from one or more peers selected from the set of peers only when network routers coupling the IPTV server to the IPTV CSD are not congested;

wherein the set of peers for the IPTV CSD are in proximity to the IPTV CSD.

27. The system of claim 25, wherein the IPTV CSD further comprises a configuration to:

transmit to the IPTV server a request to replace a failed peer;

receive from the IPTV server an indication of a particular peer that distributes the video stream which the IPTV CSD is receiving; and receive from the IPTV server the video stream when a replacement peer is unavailable, when there is a sufficient amount of IPTV server download capacity, and when there is sufficient bandwidth between the IPTV server and the FTTN switch.

28. The system of claim 25, wherein the IPTV CSD further comprises a configuration to:

receive the set of peers from the IPTV server;

divide a streaming rate of the video stream equally among the set of peers;

calculate which stream segments to receive from which peers in the set of peers;

calculate an amount of buffering to use to receive the stream from the peers; and transmit a request to each peer in the set of peers for the appropriate video streams.

29. A system comprising an Internet Protocol Television (IPTV) content storage device (CSD) configured to:

transmit a request to an IPTV server to view a video stream;

receive the video stream from the IPTV server when the IPTV server has enough bandwidth to serve the video stream; and receive a message from the IPTV server, the message including a bandwidth to be obtained from peers, a peer set to use, and an encoding bandwidth of the video stream;

receive a maximum peer bandwidth that can be distributed by peers of the IPTV CSD, the maximum peer bandwidth that can be served by the peers is determined by subtracting from a total capacity of south bound links of an FTTN switch a bandwidth due to a download by viewers into the IPTV CSD and a bandwidth due to uploads by peers;

receive an identification of peers that have the requested video stream and uplink capacity to serve the requested video stream; and receive an encoding bandwidth of the video stream which can be provided by the IPTV server;

wherein the download bandwidth due to the download by viewers is determined by adding one to a total number of viewers in a community prior to the request from the IPTV CSD, and multiplying the resulting sum by an average bit streaming rate for the video stream; and wherein the upload bandwidth due to an upload by the peers is determined by adding a total bandwidth obtained by viewers in a community from the peers and a bandwidth that the peers would distribute to the IPTV CSD.

30. The system of claim 29, wherein the peers that have the requested video stream are from a same community as the IPTV CSD and are in proximity to the IPTV CSD.

31. The system of claim 29, wherein the IPTV CSD further comprises a configuration to:

transmit to the IPTV server a request to replace a failed peer;

receive from the IPTV server a replacement peer when an available peer is found; and receive the video stream from the IPTV server when an available peer is not found.

32. The system of claim 29, wherein the IPTV CSD receives the video stream when network routers connecting the IPTV server and the IPTV CSD are not congested.

* * * * *